No. 714,899. Patented Dec. 2, 1902.
E. B. HAYES.
SANDING MACHINE.
(Application filed. Dec. 30, 1901.)
(No Model.) 8 Sheets—Sheet 1.

No. 714,899. Patented Dec. 2, 1902.
E. B. HAYES.
SANDING MACHINE.
(Application filed Dec. 30, 1901.)

(No Model.) 8 Sheets—Sheet 2.

Witnesses
Harold G. Barth.
Louis B. Erwin.

Inventor:
Eli B. Hayes.
By Rector & Hibben
His Attys.

No. 714,899. Patented Dec. 2, 1902.
E. B. HAYES.
SANDING MACHINE.
(Application filed Dec. 30, 1901.)
(No Model.) 8 Sheets—Sheet 3.

No. 714,899. Patented Dec. 2, 1902.
E. B. HAYES.
SANDING MACHINE.
(Application filed Dec. 30, 1901.)
(No Model.) 8 Sheets—Sheet 5.

Witnesses
Harold G. Barrett
Louis B. Erwin

Inventor:
Eli B. Hayes
By Rector & Hibben
his Attys

No. 714,899. Patented Dec. 2, 1902.
E. B. HAYES.
SANDING MACHINE.
(Application filed Dec. 30, 1901.)
(No Model.) 8 Sheets—Sheet 6.

No. 714,899. Patented Dec. 2, 1902.
E. B. HAYES.
SANDING MACHINE.
(Application filed Dec. 30, 1901.)
(No Model.)
8 Sheets—Sheet 7.

UNITED STATES PATENT OFFICE.

ELI B. HAYES, OF OSHKOSH, WISCONSIN.

SANDING-MACHINE.

SPECIFICATION forming part of Letters Patent No. 714,899, dated December 2, 1902.

Application filed December 30, 1901. Serial No. 87,754. (No model.)

*To all whom it may concern:*

Be it known that I, ELI B. HAYES, residing at Oshkosh, in the county of Winnebago, State of Wisconsin, have invented certain new and useful Improvements in Sanding-Machines, of which the following is a specification.

My invention relates to what are known as "sanding-machines;" and the object thereof is to provide an improved and efficient machine of this character whose points of advantage and utility will be apparent from the description hereinafter given.

In the drawings, Fig. 2ª, a section of a portion of the main frame and the movable frame and rack and showing a projecting lip 31; Figs. 10, 10ª, and 11 are detail views of the chain, Fig. 10ª being taken on the line 10ª of Fig. 10; Figs. 12 and 13, detail views of the adjustable bearings for the lower sanding-rolls; Figs. 14, 15, and 16, detail views of the yielding pressure-rollers 75; Fig. 16ª, a plan, partly in section, of the saw and sand head.

My machine, as herein shown, has a frame 1 for the supporting and mounting of the various parts and is provided with the two upper sanding-rolls 2 and 3 and the lower sanding-rolls 4 and 5, which in the present instance are driven by the main drive-shaft 6 by means of the following connections: A pulley 7 on the drive-shaft has a belt 8 extending over the belt-tightening pulley 9 and thence over the driving-pulleys 10, 11, 12, and 13 of the sanding-rolls 3, 5, 2, and 4, respectively, Fig. 2.

Figure 2:
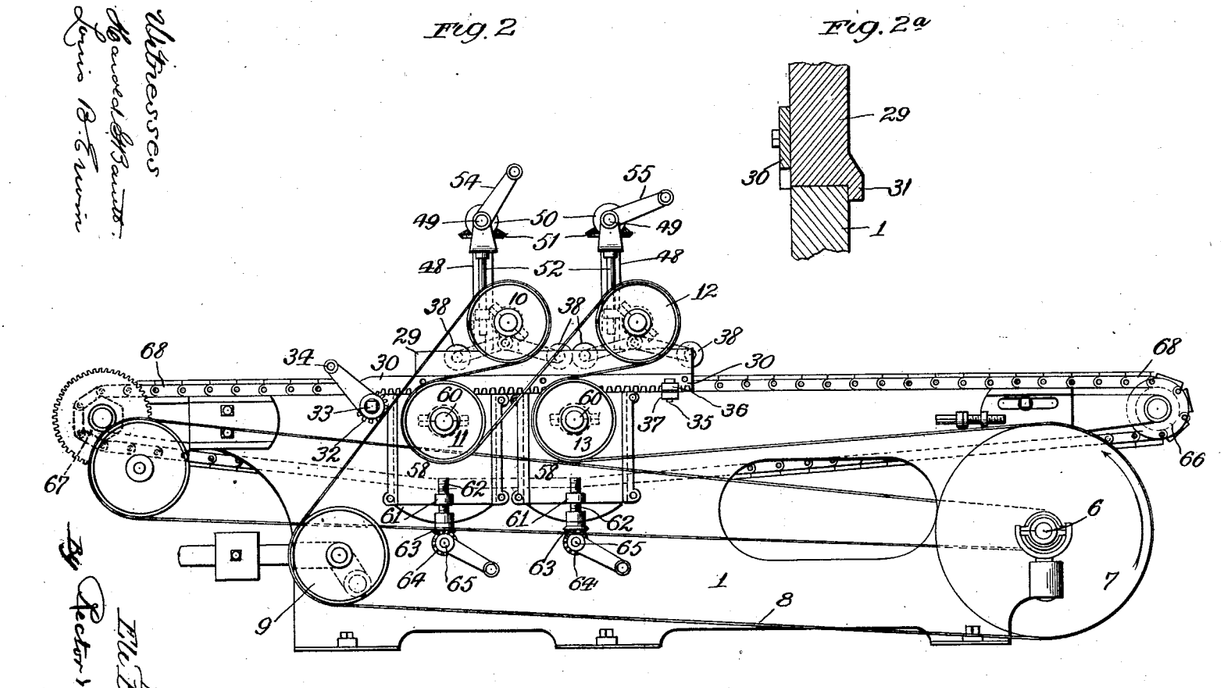
Fig. 2, an elevation thereof looking at the machine from one side.
Figure 3:
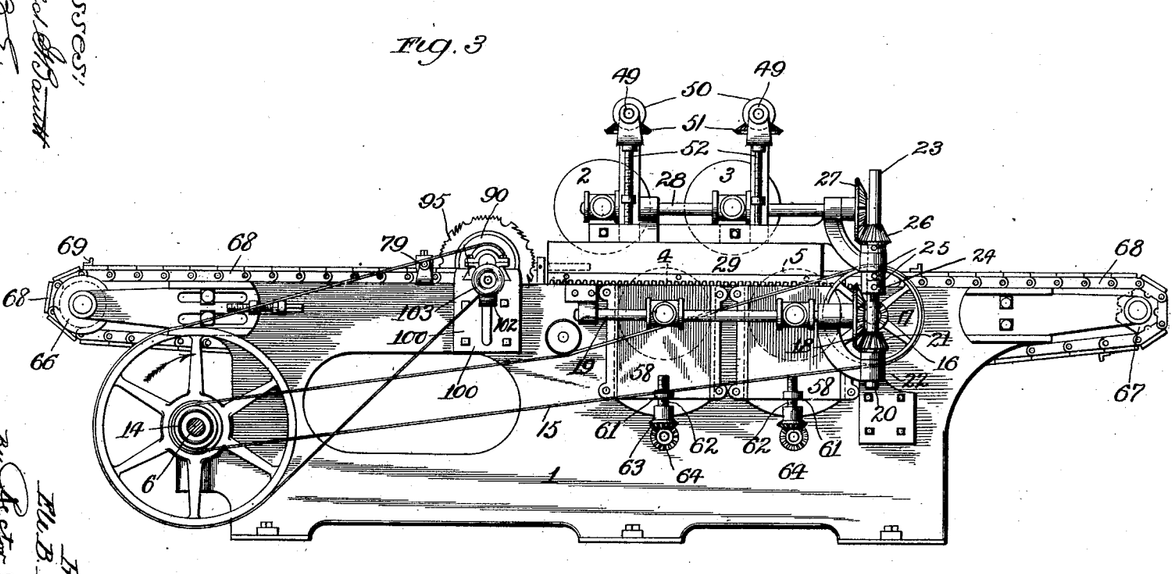
Fig. 3, an elevation of the other side of the machine.
Figure 4:
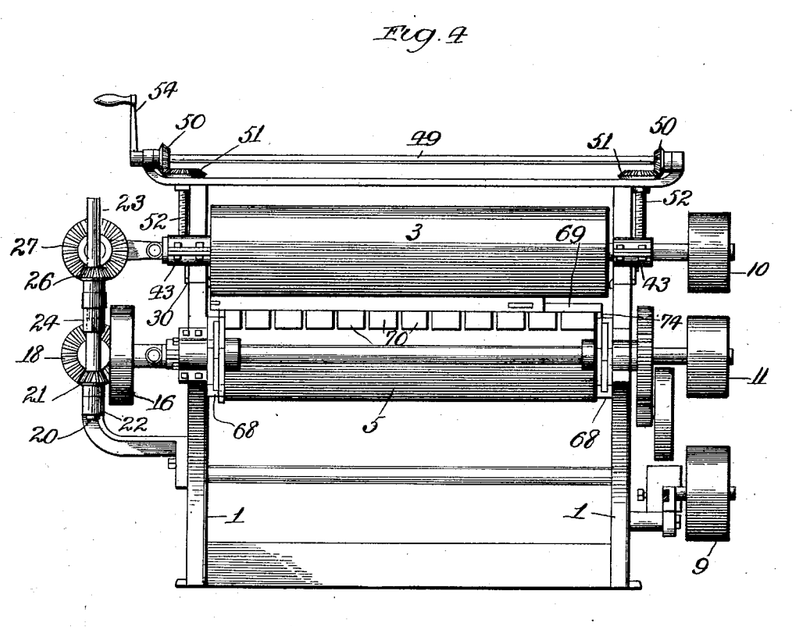
Fig. 4, an end view of the machine.

Referring to Fig. 3, the vibrating devices for the sanding-rolls, which devices are substantially the same in construction and operation as those illustrated in my prior patent, No. 590,836, are also driven by the same drive-shaft 6 which drives the sanding-rolls, as above described, but from the other side of the machine. The shaft 6 has a small pulley 14, from which motion is transmitted by the belt 15 to a pulley 16, which carries a bevel-pinion 17, meshing with the corresponding bevel-pinion 18 on the horizontal shaft 19 of the lower set of vibrating devices. The pinion 18 in turn drives a vertical shaft or arbor 20 by means of the bevel-pinion 21, which shaft 20 is mounted in a bearing 22 on the machine-frame, Fig. 3. This shaft is arranged in axial alinement with and coupled to another shaft 23 by means of a coupling-sleeve 24, held to both shafts by set-screws 25. The upper shaft 23 carries a bevel-pinion 26, meshing with the bevel-pinion 27 on the horizontal shaft 28 of the upper set of vibrating devices. The object of so breaking or cutting off the vertical shaft 20 23 into its two parts or sections at a point within the sleeve is to permit of its disconnection for the purpose of allowing the entire auxiliary frame 29, on which the upper sanding-rolls and upper vibrating devices are mounted, to be bodily moved along the machine-table. To effect this movement, the movable frame 29 has on its outer face, preferably at both sides of the machine, a rack 30, formed separate or integral therewith and is also provided on each inner side with a depending lip 31, (see Fig. 2ª,) which lips engage the inner sides of the machine-frame to prevent the lateral displacement of the movable frame and cause it to always move with accuracy longitudinally of the machine. Actuating-pinions 32, which are secured at both sides of the machine to a transverse shaft 33, engage with the racks and are adapted whenever the shaft is operated by the handle or crank 34 to move the frame 29 back and forth, and thereby expose the lower sanding-rolls, which can then be inspected and provided with new sandpaper with the same facility as the upper sanding-rolls. However, before the frame 29 can be so moved the coupling-sleeve 24 must be loosened and permitted to slip down to the point where the shaft is broken, and also the driving-belt 8 on the other side of the machine must be thrown off, whereupon the frame 29 will be free to move in the manner explained. If desired, any suitable lock may be provided for this frame to lock it in its proper normal position—as, for instance, the pin 35, passing through the lugs 36 and 37, arranged, respectively, on the movable frame and the machine-frame. The movable frame 29 also carries and supports the two pairs of pressure-rolls 38, extending transversely of the machine-table and whose short journals are pivotally connected to the pairs of links 39 and 40, the inner ends of which are pivoted on a pin 41 in the same vertical plane as the axis of the roll-shaft and extending horizontally from the side of a horizontal strip or bar 42, fastened to the two bearing-boxes 43 of the sand-rolls. In order to adjust the position of the pressure-rolls toward or away from the machine-table, I employ suitable means, which in the present instance comprise the series of screws 44, passing freely through the posts 45, swiveled on the bar 42 and by its screw-threads engaging the posts 46, swiveled on the links. The pressure-rolls press upon the work with a yielding pressure and are free to ascend and also to descend until limited by the collar 47 on the screws.

Figure 1:
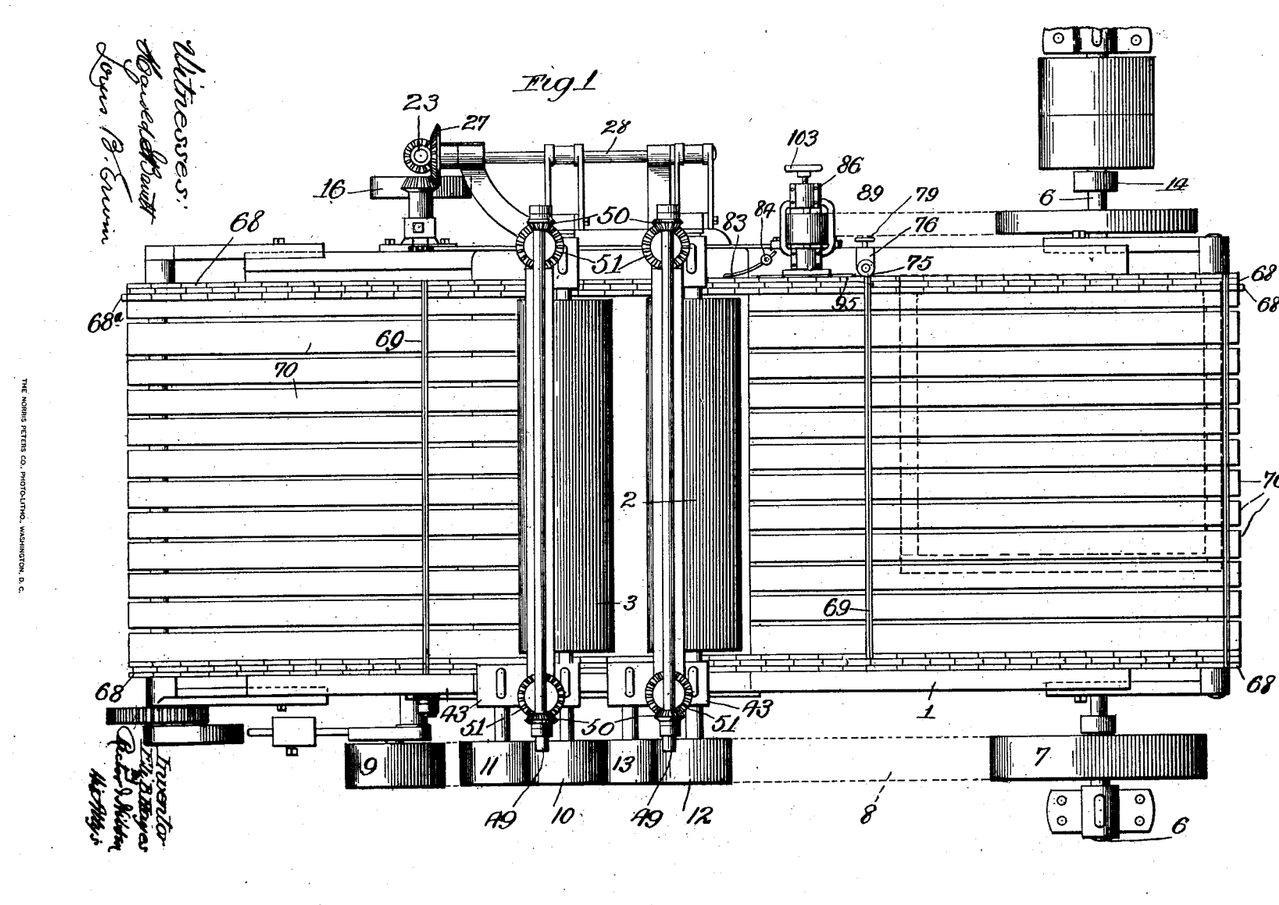
Figure 1 is a plan view of the machine.
Figure 5:
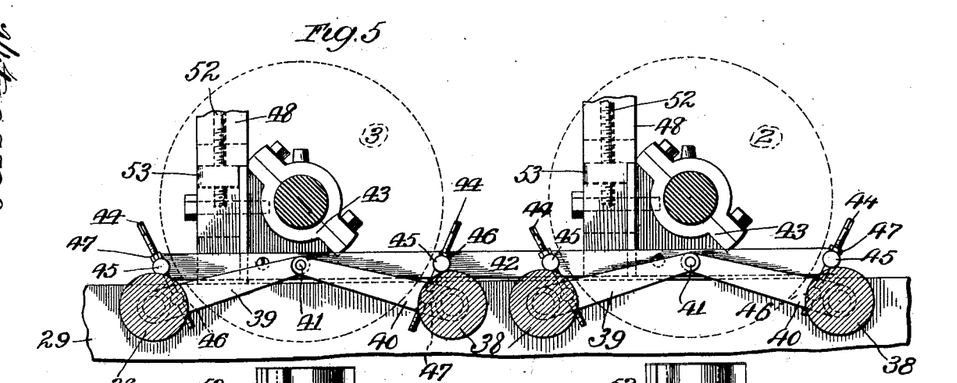
Fig. 5, a sectional elevation on the line 5 5 of Fig. 6.
Figure 6:
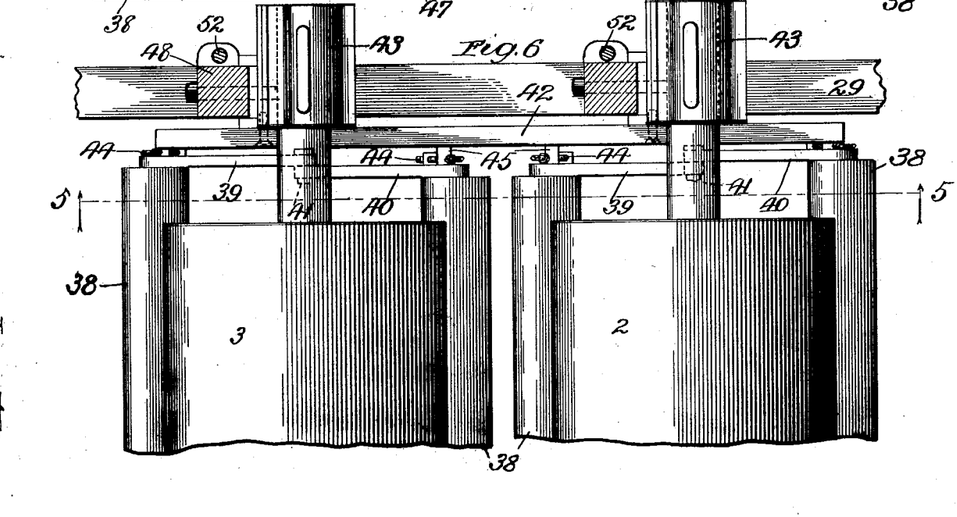
Fig. 6, a sectional plan of one end of the upper sanding-rolls and the pressure-rolls.

Referring to Figs. 1, 2, and 3, the movable frame 29 has upwardly-extending posts or standards 48 on both sides of the machine, the opposite corresponding posts having top bearings for the transverse shafts 49, provided at each end with a bevel-pinion 50, meshing with a bevel-pinion 51, secured to the vertical screw. There are therefore four of these screws in the present instance, one for each arm or standard and journaled therein with their lower screw-threaded ends engaging the lugs 53 on the sanding-roll bearings, as seen in Figs. 2 and 5. The shafts 49 are here intended to be separately rotated, and to this end the two cranks or handles 54 55, Fig. 2, are provided and preferably removably secured to the shafts, respectively.

Figures 10, 10A, 11, 12, 13, 14, 15, 16:
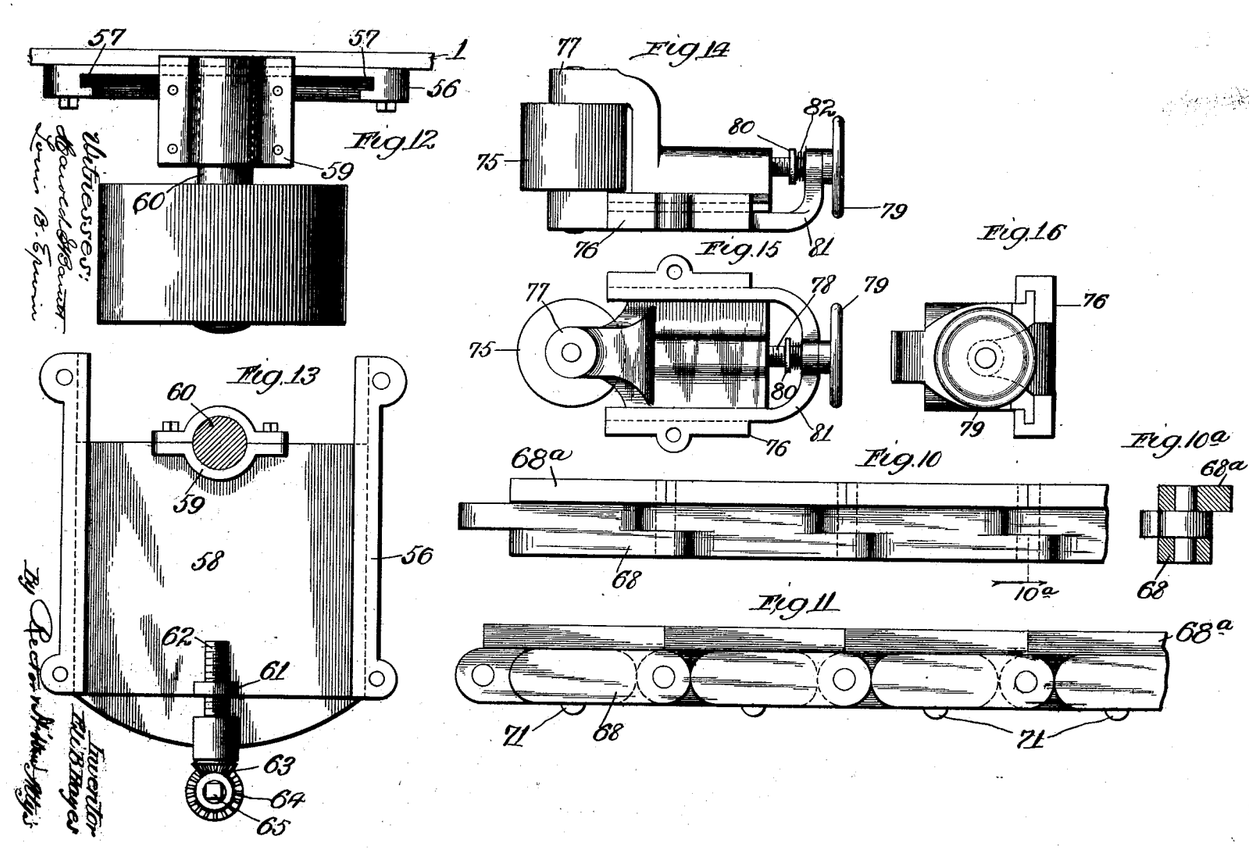
Figure 16A:
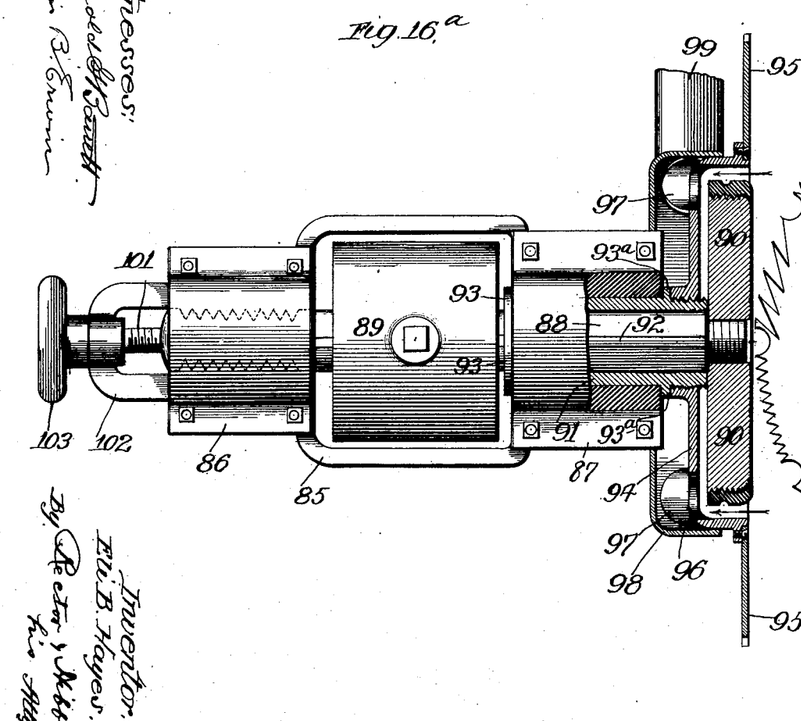

The lower sanding-rolls are also capable of adjustment and in the present instance by the means illustrated in the general views, Figs. 2 and 3, and in the detail views, Figs. 12 and 13. As the construction of the parts of one of the lower sanding-rolls is the same in both a description of the parts of one sanding-roll will suffice for both. A guide or slide frame 56 is bolted or otherwise secured to the machine-frame, Fig. 12, to provide the vertical guides 57 for the purpose of receiving the vertical plate 58, which supports on its top edge the bearing 59 for the shaft 60 of the roll. At the lower end of this plate 58 is a lug 61 engaged by the adjusting-screw 62, which is rotatable in the lower end of the guide-frame 56. The lower end of this screw 52 has a bevel-pinion 63 meshing with the corresponding bevel-pinion 64, mounted on a transverse shaft 65, extending to the opposite side of the machine, where it operates a similar set of pinions or gears, it being understood that the opposite end of each lower sanding-roll is provided with similar means for adjustment, which are simultaneously operated. One end of each shaft 65 is angular to receive a key or wrench whereby the lower sanding-rolls may be adjusted in the present instance independently of each other.

Figures 7, 8:
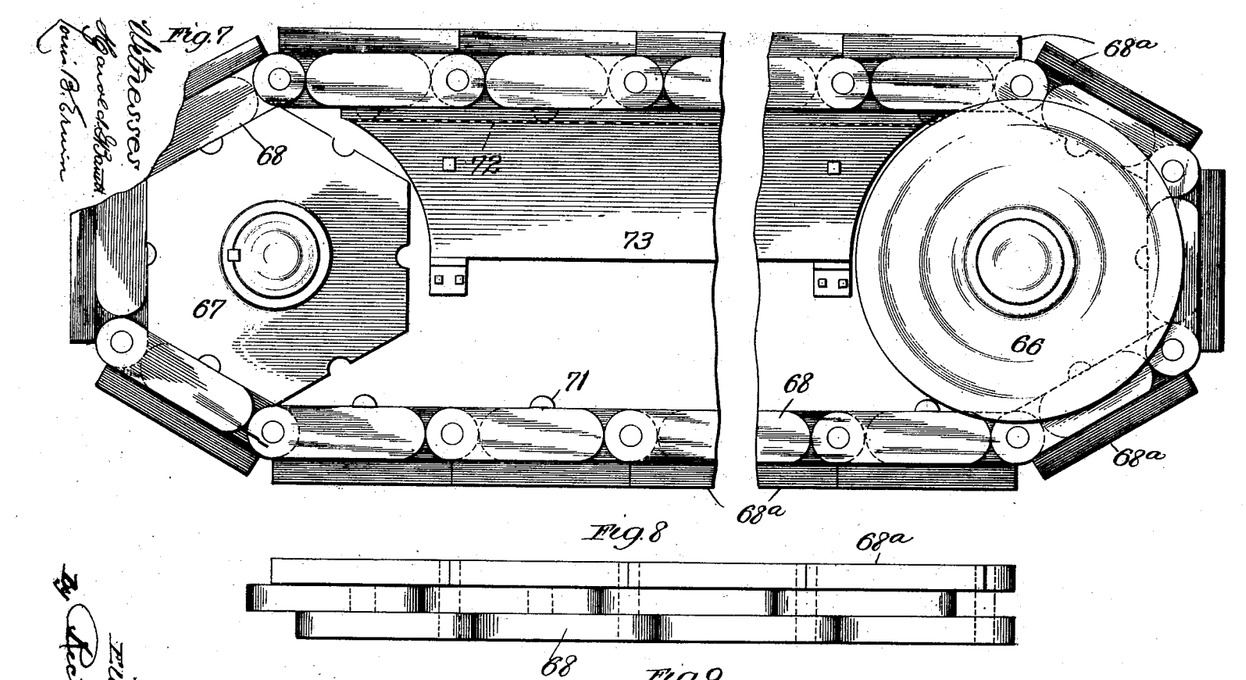
Fig. 7, a side elevation of the chain-beam and chain.
Fig. 8, a plan view of a portion of the chain.
Figure 9:
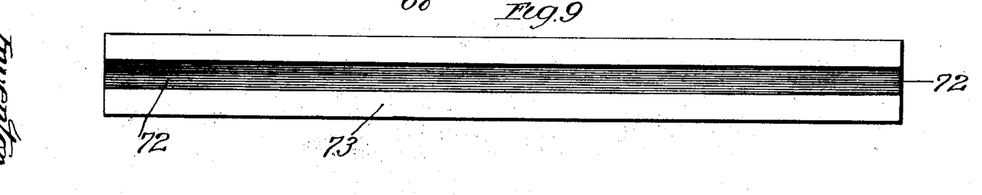
Fig. 9, a plan view of the chain-beam.

At opposite ends of the machine and journaled in the main frame are the wheels 66 and 67, the latter of which is the driving-wheel and made hexagonal to coöperate with the chains 68, which run longitudinally of the machine, on opposite sides thereof, Figs. 1, 2, 3, 4, and 7. At intervals the chains are connected by the transverse slats or bars 69, which serve to force the work or stock past the tools and through the machine. Between the chain and in front and rear of the sanding-rolls is arranged a series of longitudinal strips 70, forming the machine bed or table, the chains running along the sides of this table. (See Fig. 4.) As indicated in Figs. 7 and 11, the links of these chains are each provided with a tooth or lug 71, which runs in a groove 72 in the chain-beam 73, one on each side of the machine, Figs. 7, 8, and 9. The two chains 68 are similar, excepting that the links of the chain on the right-hand side of the machine, Fig. 1, are provided with a raised lip 68ª on that side next to the machine-table and the lip of the one chain, as just described, comes substantially to the top of such table, while the links of the other chain may be built up or provided with small blocks 74 at intervals where the cross-bars 69 are fastened thereto. As illustrated, Fig. 4, the check-rail sash, which is here being operated upon by the machine, engages or catches over this lip of the rail, whereby such sash is kept in proper position while passing through the machine and prevented from lateral movement or displacement. Sashes of less width than the machine-table may thus be carried through the machine, as indicated in Fig. 1; but it will be understood that a check-rail sash whatever its size is always engaged upon one side by the lipped chain. In order to keep the sash pressed inwardly against the lip of the conveying-chain, a small roller 75, pressing with a yielding pressure against the edge of the sash, is arranged on the machine-frame just in advance of the jointing-saw, as shown by the plan view and side elevation, Figs. 1 and 3, and by the detail views, Figs. 14, 15, and 16. Referring to these detail views, a slide-frame 76 is secured to the top of the machine-frame and provided with guides, Fig. 16, in which slides the roller-frame 77, on whose inner end the roller is journaled on a vertical axis. On the outer end of the slide-frame loosely works a screw 78, operated by a hand-wheel 79 and adapted to engage the roller-frame, so that the latter may be adjusted laterally toward or away from the right-hand chain, Fig. 1. The screw 78 is provided with a collar or flange 80, between which and the yoke-bearing 81 of the screw is interposed a spring 82, so that the screw may yield for any inward pressure. By simply turning the hand-wheel 79 the roller 75 may be adjusted inwardly or outwardly, accordingly as such wheel is turned in one direction or the other. To keep the sash pressed toward the left, Fig. 1, thus inwardly after it has passed the roller and to thereby continue the pressure to hold the sash against the chain's lip, suitable means may be employed, such as the spring 83, secured in the post 84, which is supported in the top edge of the right-hand side frame of the machine. When the sash has encountered the sanding-rolls in its progress through the machine, it is unnecessary to make any further provision for holding it against the lip of the chain inasmuch as the pressure of the sanding-rolls while operating on the sash will hold such sash firmly against the particular cross-bar which is conveying it through the machine, so that any lateral displacement of the sash is impossible.

Figure 17:
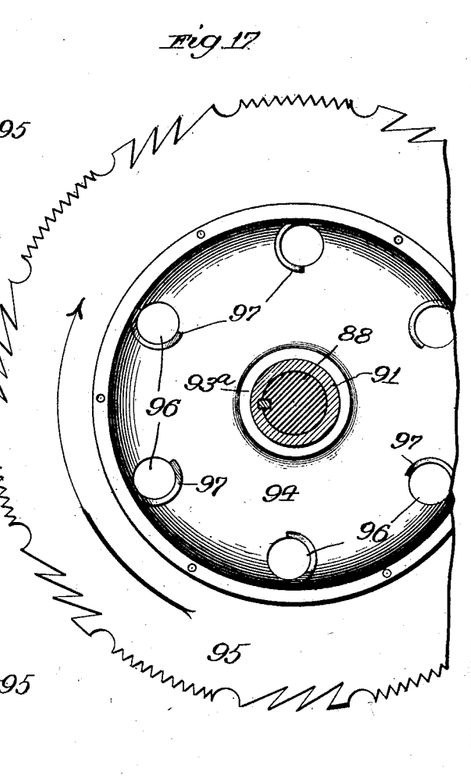
Fig. 17 an elevation of the saw-head and saw shown in Fig. 16ª.

The jointing-saw and sand-head are of novel and advantageous construction and arrangement, and, as shown, this saw and sand-head are mounted in and supported by a frame 85, secured in suitable manner to the machine-frame 1, on the left-hand side thereof, with the saw longitudinal of the machine, all as clearly shown in Figs. 1 and 3. In bearing-box 86 and 87 is journaled the sand-head shaft or arbor 88, which, as shown in Fig. 16ª, is babbitted at its outer end in the box 86, so as to move rotarily but not longitudinally of such box, and such arbor is driven by a pulley 89. The extreme inner end of the arbor 88 is of reduced diameter and threaded to receive the sand-head 90. Within the box 87 the arbor 88 is surrounded by a sleeve 91, splined on such arbor, which has a longitudinal key 92, received by a corresponding groove in the sleeve, so that the sleeve will rotate with the shaft. The sleeve also has a fixed flange 93 outside the box 87 and at the end adjacent the pulley 89 another fixed flange 93ª. The inner end of the sleeve, just outside the bearing-box 87, is screw-threaded to receive the disk-shaped frame 94, which screws up against the flange 93ª and carries the saw 95, screwed, bolted, or otherwise secured to its frame. This saw, as shown in Fig. 17, is a combination rip and cut-off saw, which is best adapted for the work to be done. Referring to Figs. 16ª and 17, the saw-frame is provided with a series of holes or openings 96, which are flanged on one side, and thus provided with the semicircular wings 97. The purpose of this construction of saw-frame is to cause a suction of the dust through such openings in the frame and into a casing 98, from which the dust is discharged through a take-off dust-pipe 99, leading to a suitable place of discharge. The wings 97 at the sides of the openings 96, in connection with the disk frame, act as a fan for sucking the dust inward through the space between the margin of the sand-head and the flanged rim of the saw-frame, as indicated by the arrows in Fig. 16ª. As shown in Fig. 3, the frame 85 is adjustable laterally or transversely of the machine in a stationary frame 100, the frame 85 being in the present instance dovetailed therein and moved by a screw 101 engaging the movable frame 85 below its arbor 88. This screw rotates freely in the bracket 102 on the stationary frame 100 and is operated by the hand-wheel 103, Figs. 3 and 16ª.

I do not herein claim the jointing-saw and sanding-head, but have made the same the subject-matter of a separate application filed by me on February 28, 1902, Serial No. 96,067.

I claim—

1. In a machine of the class described, the combination, with the machine-frame and sanding-rolls, of an auxiliary frame supporting such rolls and adapted to be moved on the machine-frame; substantially as described.

2. In a machine of the class described, the combination of the machine-frame, sanding-rolls, an auxiliary frame supporting such rolls and adapted to be moved on the machine-frame, a rack on the auxiliary frame and a pinion coöperating with the rack to move such latter frame; substantially as described.

3. In a machine of the class described, the combination of the machine-frame, sanding-rolls, an auxiliary frame supporting such rolls and adapted to be moved longitudinally on the machine-frame, a guide to prevent lateral movement of the auxiliary frame, a rack on each side of the auxiliary frame, and a shaft extending transversely of the machine and having pinions coöperating with said racks; substantially as described.

4. In a machine of the class described, the combination of the machine-frame, sanding-rolls, an auxiliary frame supporting such rolls and adapted to be moved on the machine-frame, a rack on the auxiliary frame, a pinion coöperating with the rack to move such auxiliary frame and lips arranged on such latter frame, and adapted to engage the machine-frame; substantially as described.

5. In a machine of the class described, the combination with the machine-frame, and sanding-rolls, of an auxiliary frame supporting such rolls and adapted to be moved on the machine-frame, and means for locking the auxiliary frame in operating position; substantially as described.

6. In a machine of the class described, the combination of the machine-frame, sanding-rolls, vibrating devices therefor, an auxiliary frame supporting such rolls and vibrating devices and movable on the machine-frame, driving mechanism for the vibrating devices and disconnectible positive driving connection between said mechanism and the vibrating devices; substantially as described.

7. In a machine of the class described, the combination of the machine-frame, sanding-rolls, vibrating devices therefor, an auxiliary frame supporting such rolls and vibrating devices and movable on the machine-frame, a driving-shaft on the machine-frame, and a driven shaft on the auxiliary frame for operating the vibrating devices, said driving-shaft being arranged to be broken or disconnected to permit the auxiliary frame to be moved; substantially as described.

8. In a machine of the class described, the combination of the machine-frame, sanding-rolls, vibrating devices therefor, an auxiliary frame supporting such rolls and vibrating devices and movable on the machine-frame, a driven shaft for operating the vibrating devices, a driving-shaft therefor, composed of two shafts or sections 20 and 23 and means for normally coupling such sections together, but arranged to permit their disconnection; substantially as described.

9. In a machine of the class described, the combination of the machine-frame, sanding-rolls, vibrating devices therefor, an auxiliary frame supporting such rolls and vibrating devices and movable on the machine-frame, a driven shaft for operating the vibrating devices, a driving-shaft therefor composed of two shafts or sections 20 and 23, a coupling-sleeve 24 and set-screws 25 securing the sections and sleeve together; substantially as described.

10. In a machine of the class described, the combination of the machine-frame, sanding-rolls, vibrating devices therefor, an auxiliary frame supporting such rolls and vibrating devices and movable on the machine-frame, a driven shaft for operating the vibrating devices, a driving-shaft therefor composed of two shafts or sections 20 and 23, the former journaled in the machine-frame and the latter in the auxiliary frame and a coupling-sleeve 24 for coupling together said sections to form practically one driving-shaft; substantially as described.

11. The combination of the machine-frame 1, movable auxiliary frame 29, sanding-rolls and vibrating devices supported by said frame 29, a driven shaft 28 for the vibrating devices provided with a gear or pinion 27, a driving-pulley 16 arranged on the machine-frame and provided with a pinion 17, a gear 18 driven by pinion 17, a driving-shaft composed of detachable sections 20, 23 and having the pinion 21 driven by gear 18 and the pinion 26 driving said gear 27; substantially as described.

12. In a machine of the class described, the combination with the machine-frame, of a conveyer-chain provided on its inner side with an upwardly-projecting lip to engage a sash; substantially as described.

13. In a machine of the class described, the combination with the machine-frame, of a conveyer-chain mounted in the frame and provided on the inner side with an upwardly-projecting lip to engage a sash and means on the machine-frame for holding the sash against such lip; substantially as described.

14. In a machine of the class described, the combination with the machine-frame, of two endless conveyer-chains mounted in the frame and connected by a series of cross-bars, one of the chains having a raised lip over which a sash may engage; substantially as described.

15. In a machine of the class described, the combination with the machine-frame and its table, of two endless conveyer-chains mounted in the frame and running at either side of the machine-table, the body of such chain being below the plane thereof, the chain on one side of the machine having a raised lip to be engaged by a sash or the like; substantially as described.

16. In a machine of the class described, the combination with the machine-frame and its table of two endless conveyer-chains mounted in the frame and running at either side of the machine-table, the body of such chain being below the plane thereof, the chain on one side of the machine having a raised lip to be engaged by a sash or the like, cross-bars connecting the chains and blocks on that chain which is unprovided with the lip to which blocks and the chain the bars are fastened; substantially as described.

17. In a machine of the class described, the combination with the machine-frame of a conveyer-chain mounted in the frame and provided on its inner side with an upwardly-projecting lip to engage a sash and means on the machine-frame for holding the sash against such lip comprising a yieldable roller projecting inward into the path of the sash and adapted to press against its edge; substantially as described.

18. In a machine of the class described, the combination with the machine-frame, of a conveyer-chain mounted in the frame and provided on its inner side with an upwardly-projecting lip to engage a sash and means on the machine-frame for holding the sash against such lip, comprising a spring-pressed roller projected inward into the path of the sash and adapted to press against the edge, substantially as described.

19. In a machine of the class described, the combination with the machine-frame, of a conveyer-chain mounted in the frame and provided on its inner side with an upwardly-projecting lip to engage a sash, and means on the machine-frame for holding the sash against such lip comprising a frame 77 mounted to slide in the machine-frame and carrying a roller 75 on a vertical axis, said frame 77 being yieldingly held with respect to the machine-frame, and mechanism for adjusting the position of the frame 77; substantially as described.

20. In a machine of the class described, the combination with the machine-frame of a conveyer-chain mounted in the frame and provided on its inner side with an upwardly-projecting lip to engage a sash and means on the machine-frame for holding the sash against such lip comprising a frame 77 mounted to slide in the machine-frame and carrying a roller 75 on a vertical axis, a screw 78 engaging the frame 77 to adjust it with respect to the machine-frame and a spring 82 operating to hold the frame 77 and its roller 75 projected against an edge of the sash; substantially as described.

21. In a machine of the class described, the combination with the machine-frame, of a conveyer-chain mounted in the frame and provided on its inner side with an upwardly-projecting lip to engage a sash and means on the machine-frame for holding the sash against such lip comprising a stationary frame 76 on the machine-frame, a frame 77 slidable in the frame 76 and carrying a roller 75, a screw working freely in the frame 77 to adjust it, a flange 80 on the screw and a spring 82 interposed between the frame 76 and the flange; substantially as described.

22. In a machine of the class described, the combination with the machine-frame, of a conveyer-chain mounted in the frame and provided on its inner side with an upwardly-projecting lip to engage a sash and means on the machine-frame for holding the sash against such lip comprising a spring-pressed roller projecting from the machine-frame and a spring 83 secured on such machine-frame; substantially as described.

23. In a machine of the class described, transverse pressure-rolls having spindles in combination with pivoted links at each end, and means for adjusting the position of the links and rolls; substantially as described.

24. In a machine of the class described, transverse pressure-rolls having spindles, in combination with links at each end, the corresponding links of the bars being pivoted to a common axis and means for adjusting the links up and down independently of each other; substantially as described.

25. In a machine of the class described, the combination with the machine-frame, a strip or support 42 supported thereby, a pair of transverse pressure-rolls rotatable in one end of links, the other end being pivoted on a common pin or axis on the strip and a pair of screws mounted in the strip and engaging the links respectively; substantially as described.

26. In combination with the machine-frame a strip or support 42 on each side of the frame and having pivot-pins 41, a pair of links 39, 40 on each side of the machine and pivoted at their adjacent ends to the pins 41, transverse pressure-rolls bearing in the outer ends of said links, a pair of screws 44 arranged at each end of the rolls and upon the strips 42 and adapted to engage the links; substantially as described.

27. In combination with the machine-frame, a strip or support 42 on each side of the frame and having pivot-pins 41, a pair of links 39, 40 on each side of the machine and pivoted at their adjacent ends to the pins 41, transverse pressure-rolls bearing in the outer ends of said links, a pair of screws 44 arranged at each end of the rolls, swiveling posts 45 supported on the strips and adapted to receive the screws, posts 46 arranged on the links and screw-threaded to receive the screws; substantially as described.

28. In combination with the machine-frame, a strip or support 42 on each side of the frame and having pivot-pins 41, a pair of links 39, 40 on each side of the machine, and pivoted at their adjacent ends to the pins 41, transverse pressure-rolls bearing in the outer ends of said links, a pair of screws 44 arranged at each end of the rolls, swiveling posts 45 supported on the strips and adapted to receive the screws, posts 46 arranged to swivel on the links and screw-threaded to receive the screws and means for limiting the downward movement of the rolls; substantially as described.

29. In combination with the machine-frame, a strip or support 42 on each side of the frame and having pivot-pins 41, a pair of links 39, 40 on each side of the machine, and pivoted at their adjacent ends to the pins 41, transverse pressure-rolls bearing in the outer ends of said links, a pair of screws 44 arranged at each end of the rolls, swiveling posts 45 supported on the strips and adapted to receive the screws, posts 46 arranged to swivel on the links and screw-threaded to receive the screws and means for limiting the downward movement of the rolls comprising collars 47 on the screw above the posts 45; substantially as described.

ELI B. HAYES.

Witnesses:
GEORGE HILTON,
JOSEPH F. HAYES.